(12) United States Patent
Sakai et al.

(10) Patent No.: US 10,158,274 B2
(45) Date of Patent: Dec. 18, 2018

(54) ROTARY MACHINE

(71) Applicant: MEIDENSHA CORPORATION, Tokyo (JP)

(72) Inventors: Tamotsu Sakai, Tokyo (JP); Tomokazu Arigami, Tokyo (JP); Hiroaki Matsuno, Tokyo (JP); Satoshi Okano, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/570,852

(22) PCT Filed: Apr. 28, 2016

(86) PCT No.: PCT/JP2016/063308
§ 371 (c)(1),
(2) Date: Oct. 31, 2017

(87) PCT Pub. No.: WO2016/178404
PCT Pub. Date: Nov. 10, 2016

(65) Prior Publication Data
US 2018/0152081 A1    May 31, 2018

(30) Foreign Application Priority Data
May 1, 2015 (JP) .................. 2015-093921

(51) Int. Cl.
*H02K 11/40* (2016.01)
*H02K 5/16* (2006.01)
*H02K 11/21* (2016.01)

(52) U.S. Cl.
CPC ............ *H02K 11/40* (2016.01); *H02K 5/16* (2013.01); *H02K 11/21* (2016.01)

(58) Field of Classification Search
CPC ........ H02K 11/40; H02K 11/01; H02K 11/02; H02K 5/16
See application file for complete search history.

(56) References Cited

U.S. PATENT DOCUMENTS 4,515,417 A * 5/1985 Shiraishi ................. F16C 19/52
                                                        384/445
5,804,903 A * 9/1998 Fisher .................... H01R 39/12
                                                        310/219

(Continued)

FOREIGN PATENT DOCUMENTS

JP    2008-537469 A    9/2008
JP    2010-525787 A    7/2010

(Continued)

OTHER PUBLICATIONS

Japanese Office Action and English translation, dated Sep. 5, 2017, 7 pages

*Primary Examiner* — Dang Le
(74) *Attorney, Agent, or Firm* — Foley & Lardner LLP

(57) ABSTRACT

A rotary machine including a rotary shaft rotatably disposed in a casing is provided. The rotary machine includes an end plate disposed at one end side of the casing in the axial direction. The rotary machine includes a recess section formed in the end plate and recessed toward the inside of the casing. The rotary machine includes a through hole formed in the recess section and through which one end section of the rotary shaft is inserted. The rotary machine includes a shaft grounding device which is provided in the recess section. The shaft grounding device is brought into contact with the one end section of the rotary shaft which is inserted through the through hole, and eliminates a shaft voltage generated in the rotary shaft.

12 Claims, 4 Drawing Sheets

(56) References Cited

U.S. PATENT DOCUMENTS

| | | | | |
|---|---|---|---|---|
| 5,955,807 | A * | 9/1999 | Kajiura | H02K 29/12 310/156.66 |
| 6,670,733 | B2 * | 12/2003 | Melfi | H02K 11/01 310/68 R |
| 8,169,766 | B2 * | 5/2012 | Oh | H02K 11/40 361/221 |
| 8,189,317 | B2 | 5/2012 | Oh et al. | |
| 2005/0285464 | A1 * | 12/2005 | Orders | H02K 5/136 310/88 |
| 2006/0007609 | A1 | 1/2006 | Oh et al. | |
| 2008/0166246 | A1 * | 7/2008 | Swanson | F04D 25/0606 417/410.1 |

FOREIGN PATENT DOCUMENTS

| | | |
|---|---|---|
| JP | 2011-135720 A | 7/2011 |
| JP | 2014-87231 A | 5/2014 |
| JP | 2015-19487 A | 1/2015 |
| WO | WO 2006/115600 A1 | 11/2006 |
| WO | WO 2008/130851 A1 | 10/2008 |

\* cited by examiner

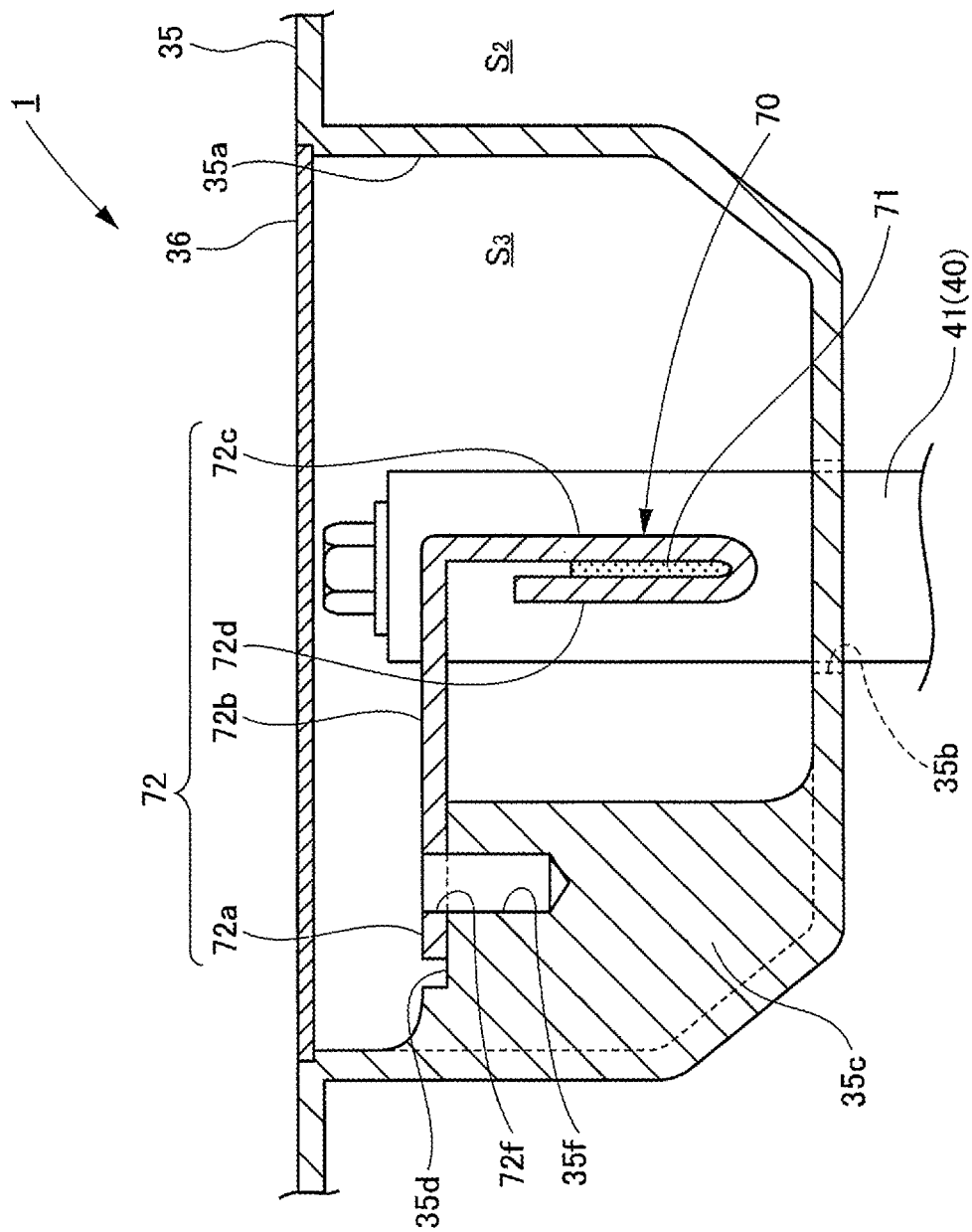

ROTARY MACHINE

TECHNICAL FIELD

The present invention relates to a rotary machine including a shaft grounding device for discharging a shaft voltage generated in a shaft system of the rotary machine.

BACKGROUND ART

In rotary machines, an electromagnetic induction voltage caused by magnetic imbalance and an electrostatic voltage resulting from rotational friction generate a shaft voltage in the shaft system. This shaft voltage causes current to flow in the shaft system and causes discharge at the bearing portions, which may cause electrolytic corrosion.

To secure the safety of rotary machines, it is necessary to prevent the electrolytic corrosion at the bearing portions resulting from the shaft voltage. In light of this, as a technique to keep the shaft voltage low enough by effective grounding, shaft grounding devices have been developed which discharge a shaft voltage generated in the shaft system by providing a shaft grounding brush to be in contact with the shaft system (for example, Patent Document 1).

The shaft grounding brush in such shaft grounding devices, in contact with the shaft system of the rotary machine, wears, and thus, the shaft grounding devices are attached on an end side of the rotary machine, being separated from the rotor and the like so that the wear of the shaft grounding brush does not affect the rotor and the like.

PRIOR ART DOCUMENT

Patent Document

Patent Document 1: Japanese Patent Application Publication No. 2015-19487

SUMMARY OF THE INVENTION

Problems to be Solved by the Invention

However, to attach a shaft grounding device at an end side of a rotary machine with the shaft grounding device separated from the rotor and the like, a space for attaching the shaft grounding device is necessary outside the casing of the rotary machine, which increases the size of the rotary machine. In addition, in the case of additionally attaching a shaft grounding device to a rotary machine already installed, there is a possibility that a space for attaching the shaft grounding device cannot be found and the shaft grounding device cannot additionally be attached.

The present invention has been made in light of the above problems, and an object thereof is to discharge a shaft voltage generated in the shaft system of a rotary machine while preventing the size of the rotary machine from increasing.

Means for Solving the Problems

A rotary machine according to a first aspect of the invention to solve the above problems is a rotary machine including a rotary shaft rotatably provided in a casing, characterized in that the rotary machine comprises an end plate provided on one end side of the casing in an axial direction; a recessed portion formed in the endplate and recessed inward of the casing; a through hole which is formed at the recessed portion and through which one end portion of the rotary shaft passes; and a shaft grounding device which is provided at the recessed portion and is in contact with the one end portion of the rotary shaft passing through the through hole to eliminate a shaft voltage generated at the rotary shaft.

A rotary machine according to a second aspect of the invention to solve the above problems is the rotary machine according to the first aspect of the invention, characterized in that the shaft grounding device includes a brush member in contact with the rotary shaft and a fixing member to fix the brush member to the recessed portion, and the brush member includes a large number of filament members which are oriented in a direction orthogonal to the rotary shaft and arranged in the axial direction of the rotary shaft.

A rotary machine according to a third aspect of the invention to solve the above problems is the rotary machine according to the second aspect of the invention, characterized in that the recessed portion includes a seat integrally formed therewith for disposing the fixing member, and the seat includes a contact surface contacting one end surface of the fixing member, a pin hole used to position the fixing member with a pin member, and a screw hole used to fix the fixing member with a bolt.

A rotary machine according to a fourth aspect of the invention to solve the above problems is the rotary machine according to the second or third aspect of the invention, characterized in that the filament members are made mainly from carbon.

A rotary machine according to a fifth aspect of the invention to solve the above problems is the rotary machine according to any one of the first to fourth aspects of the invention, characterized in that the endplate is a lid member forming an electrical room accommodating an electrical part.

A rotary machine according to a sixth aspect of the invention to solve the above problems is the rotary machine according to the fifth aspect of the invention, characterized in that the electrical room accommodates a position detector which detects a rotational phase of the rotary shaft.

A rotary machine according to a seventh aspect of the invention to solve the above problems is the rotary machine according to any one of the first to sixth aspects of the invention, characterized in that the rotary machine comprises a seal member between the through hole and the rotary shaft.

Effect of the Invention

For the rotary machine according to the first aspect of the invention, the recessed portion is provided in the endplate provided at one end side of the casing in the axial direction, and the shaft grounding device is provided at the recessed portion, so that it is possible to discharge the shaft voltage generated at the rotary shaft while preventing the size of the rotary machine from increasing.

For the rotary machine according to the second aspect of the invention, it is possible to positively discharge the shaft voltage at the rotary shaft while achieving a simple configuration of the shaft grounding device.

For the rotary machine according to the third aspect of the invention, it is possible to attach the shaft grounding device with a simple configuration. In addition, since the shaft grounding device with a simple configuration is attached to the seat integrally formed with the recessed portion, the recessed portion can be small.

For the rotary shaft according to the fourth aspect of the invention, it is possible to positively discharge the shaft voltage at the rotary shaft.

For the rotary machine according to the fifth aspect of the invention, since the recessed portion is provided in the lid member of the electrical room, the shaft grounding device can be provided even in a rotary machine including electrical parts. Hence, in this rotary machine, it is possible to discharge the shaft voltage generated at the rotary shaft while preventing the size of the rotary machine from increasing.

For the rotary machine according to the sixth aspect of the invention, it is possible to provide the shaft grounding device even for the rotary machine including a position detector. Hence, in this rotary machine, it is possible to discharge the shaft voltage generated at the rotary shaft while preventing the size of the rotary machine from increasing.

For the rotary machine according to the seventh aspect of the invention, since the shaft grounding device can be isolated from the inside of the rotary machine, even when a portion of the shaft grounding device in contact with the rotary shaft (for example, filament members of a brush member) is worn, it is possible to prevent the powder created from the wear from entering the inside of the rotary machine. In the case where the end plate is a lid member forming an electrical room, it is also possible to prevent the powder created by the wear from entering the inside of the electrical room.

BRIEF DESCRIPTION OF THE DRAWINGS

FIG. 4 is an enlarged sectional view (sectional view taken along arrows IV-IV in FIG. 2) illustrating a structure of the rotary machine according to Embodiment 1.

MODE FOR CARRYING OUT THE INVENTION

Hereinafter, descriptions are provided in detail for an embodiment of a rotary machine according to the present invention with reference to the attached drawings. As a matter of course, it goes without saying that the present invention is not limited to the following embodiment, but various modifications can be made within the scope not departing from the gist of the present invention.

Embodiment 1

The structure of the rotary machine according to Embodiment 1 of the present invention will be described with reference to FIGS. 1 to 4.

Figure 1:
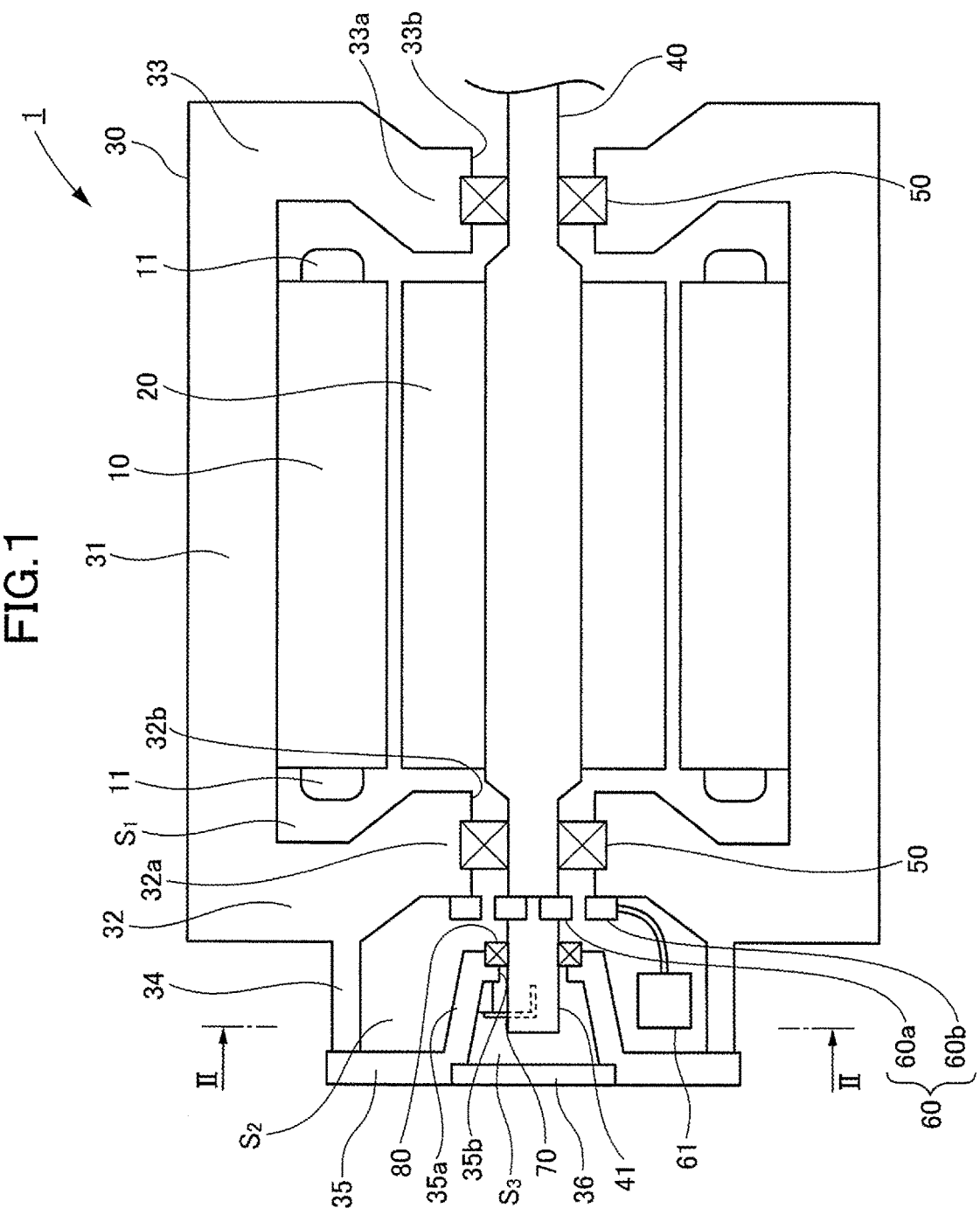
FIG. 1 is a longitudinal sectional view illustrating a structure of a rotary machine according to Embodiment 1.

As illustrated in FIG. 1, the rotary machine 1 includes a substantially cylindrical stator 10 and a rotor 20 rotatably provided on the inner circumferential side of this stator 10, and the rotor 20 rotates by the rotational magnetic field generated by the stator 10. The stator 10 is fixed to a casing 30 covering the stator 10, and the rotor 20 is fixed to a shaft 40 rotatably provided in a casing 30.

The casing 30 has a substantially cylindrical frame 31 covering the outer circumferential side of the stator 10 and substantially disk-shaped brackets 32 and 33 covering the opening sides, in other words, both axial end sides (the right and left sides in FIG. 1) of the frame 31. The frame 31 and the brackets 32 and 33 of the casing 30 form space $S_1$, which accommodates the stator 10 and the rotor 20.

The brackets 32 and 33 have recessed portions 32a and 33a formed such that the portions on the inner circumferential side in the radial direction (on the center side in the up-down direction in FIG. 1) are recessed inward in the axial direction relative to the portions on the outer circumferential side in the radial direction (on the upper and lower sides in FIG. 1), along the shapes of the both end portions in the axial direction of the stator 10 and the rotor 20 accommodated on the inner side in the axial direction of the brackets 32 and 33 (between the brackets 32 and 33).

As described above, the brackets 32 and 33 have such shapes that the portions on the outer circumferential side in the radial direction corresponding to the stator 10 protrude outward in the axial direction from the portions on the inner circumferential side in the radial direction corresponding to the rotor 20, so that end portions (coil ends 11) of the stator 10, protruding outward in the axial direction from the end portions of the rotor 20, can be accommodated in space $S_3$ without interfering the casing 30.

The recessed portions 32a and 33a have through holes 32b and 33b passing in the axial direction (right-left direction in FIG. 1) through the centers in the radial direction of the recessed portions 32a and 33a, and passing through the through holes 32b and 33b are the ends of a shaft 40. Attached to the through holes 32b and 33b are bearings 50, with which the shaft 40 rotates smoothly.

The bracket 32 provided at a non-direct-connection side (left side in FIG. 1) opposite to the direct-connection side (right side in FIG. 1) connected to the non-illustrated drive unit has an annular portion 34 surrounding the outer circumferential side of the recessed portion 32a, protruding in the axial direction, and formed integrally with the bracket 32. The bracket 32 is also provided with a first lid (end plate, lid member) 35 closing the distal end side of this annular portion 34 (on the left side in FIG. 1). The recessed portion 32a and annular portion 34 of the casing 30 and the first lid 35 form space (electrical room) $S_2$, which accommodates a position detector (electrical part) 60, such as a resolver or an encoder, detecting the rotational phase of the rotary machine (shaft 40) and a harness member (electrical part) 61 electrically connected to the position detector 60.

Figure 3:
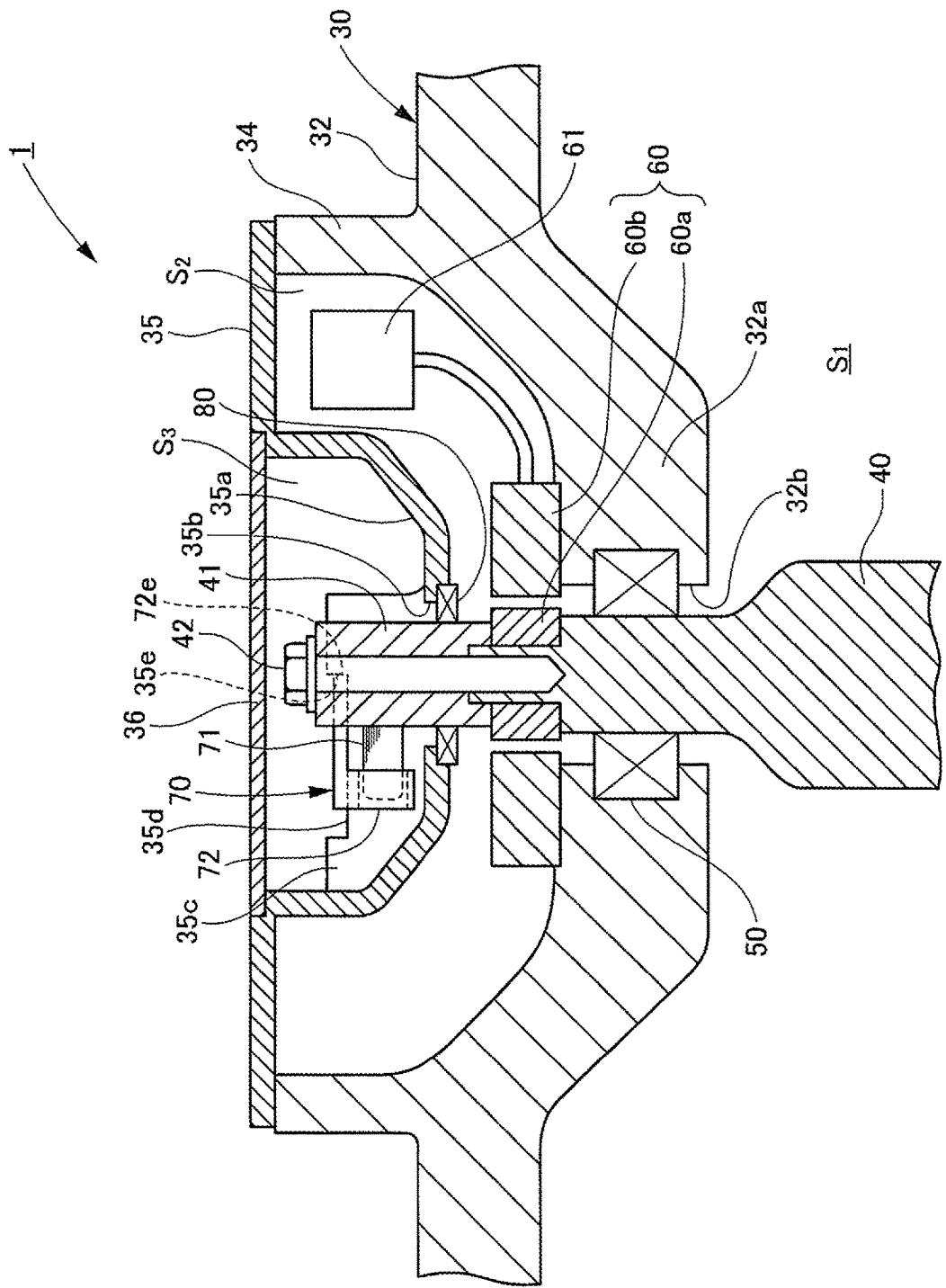
FIG. 3 is an enlarged sectional view (sectional view taken along arrows in FIG. 2) illustrating a structure of the rotary machine according to Embodiment 1.

The position detector 60 includes a rotational portion 60a provided at an end portion on the one end side (non-direct-connection side) of the shaft 40 and a stationary portion 60b facing the rotational portion 60a and provided on the bracket 32 on the one end side (non-direct-connection side) of the casing 30, and is capable of detecting the rotational phase of the shaft 40 (rotary machine 1). As illustrated in FIG. 3, at the one end side (upper side in FIG. 3) of the shaft 40, a cylindrical extension shaft 41 is assembled with a bolt 42, and the rotational portion 60a of the position detector 60 is integrally fixed to the shaft 40, being sandwiched between the shaft 40 and an extension shaft 41. On the other hand, the stationary portion 60b of the position detector 60 is fixed to the recessed portion 32a of the casing 30 with non-illustrated mechanical fastening means.

Like the brackets 32 and 33 of the casing 30, the first lid 35 has a recessed portion 35a formed such that the portions on the inner circumferential side in the radial direction (on the center side in the right-left direction in FIG. 3) are recessed inward in the axial direction (downward in FIG. 3) relative to the portions on the outer circumferential side in the radial direction (on the right and left sides in FIG. 3). As described above, the first lid 35 has such a shape that the portions on the outer circumferential side in the radial direction protrude outward in the axial direction from the portions on the inner circumferential side in the radial direction, so that the harness member 61 can be accommodated in space $S_2$ without interfering the first lid 35.

The recessed portion 35a of the first lid 35 has a through hole 35b passing in the axial direction (up-down direction in FIG. 3) through the center in the radial direction of the recessed portion 35a, and passing through the through hole 35b is one end portion (the extension shaft 41) of the shaft 40.

The casing 30 is provided with a second lid 36 closing the recessed portion 35a of the first lid 35. The recessed portion 35a of the first lid 35 and the second lid 36 form space $S_3$, in which the end portion of the shaft 40 (the extension shaft 41) is positioned, and which accommodates a shaft grounding device 70 for discharging the shaft voltage generated in the shaft 40.

Figure 2:
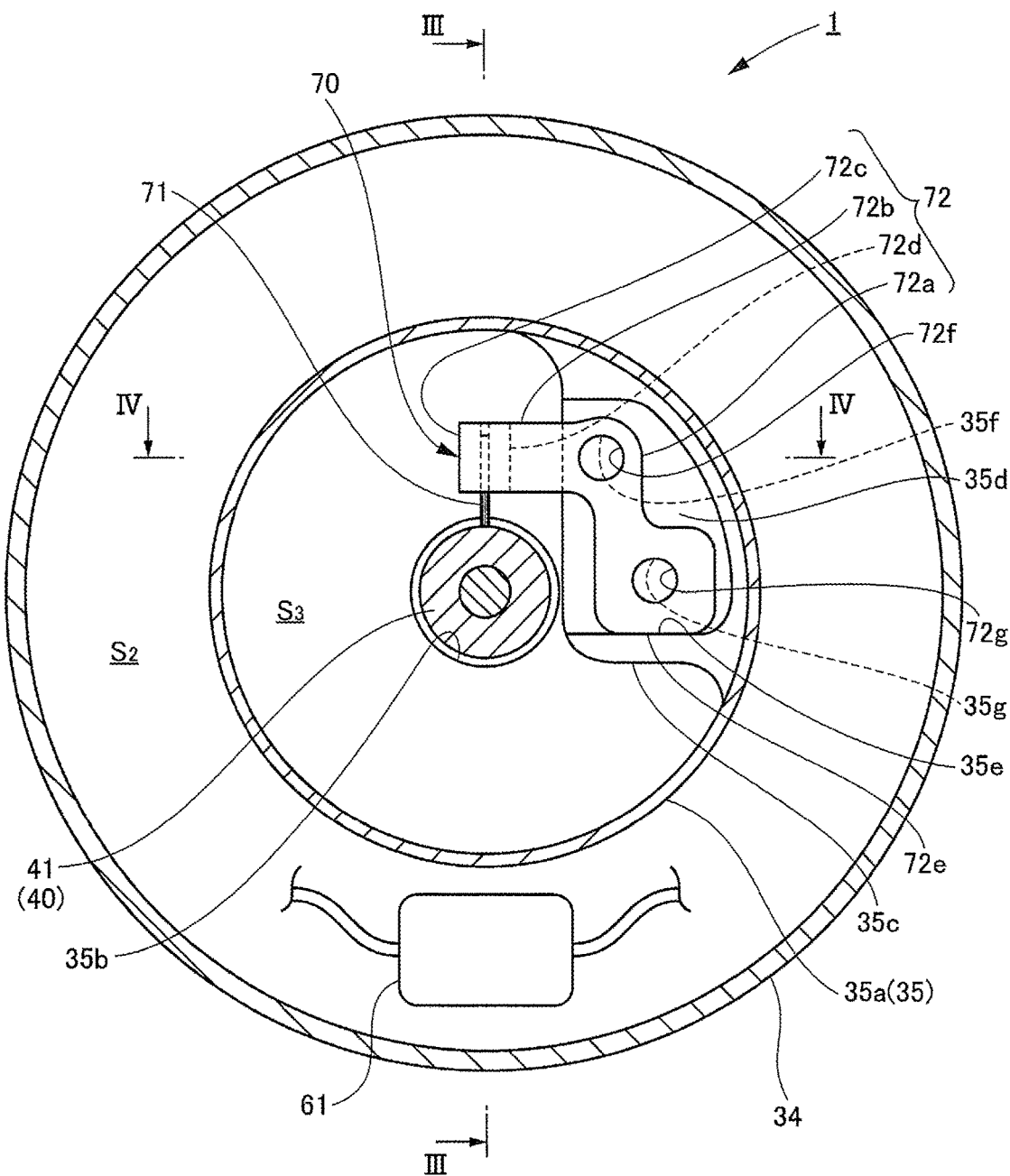
FIG. 2 is a transverse sectional view (sectional view taken along arrows II-II in FIG. 1) illustrating a structure of the rotary machine according to Embodiment 1.

As illustrated in FIGS. 2 and 4, the shaft grounding device 70 includes a shaft grounding brush 71 in contact with the shaft 40 and a shaft grounding bracket 72 holding the shaft grounding brush 71. The shaft grounding bracket 72 includes an attachment portion 72a for attaching the shaft grounding bracket 72 to the first lid 35 with non-illustrated mechanical fastening means (such as a bolt), an extension 72b extending to the periphery of the shaft 40 (extension shaft 41) from the attachment portion 72a, a brush attachment portion 72c bent from the extension 72b to the rotor 20 side (downward in FIG. 4) at a substantially right angle and extending substantially in parallel to the shaft 40 (extension shaft 41), and a folded-back portion 72d folded back at the lower end of the brush attachment portion 72c (at the lower end in FIG. 4). The shaft grounding brush 71 is a bundle of carbon filaments (filament members) made mainly from carbon, and a large number of carbon filaments are sandwiched between the brush attachment portion 72c and folded-back portion 72d of the shaft grounding bracket 72.

The recessed portion 35a of the first lid 35 is provided with a seat portion (seat) 35c for attaching the attachment portion 72a of the shaft grounding device 70, and formed on the seat portion 35c are a machined attachment seat surface 35d and an abutting surface (contact surface) 35e. In addition, formed in the seat portion 35c is a pin hole 35f for a non-illustrated positioning pin (pin member) to be inserted in, and formed in the attachment portion 72a of the shaft grounding bracket 72 is a pin hole 72f for the non-illustrated positioning pin to be inserted in, corresponding to the pin hole 35f.

Thus, as for the shaft grounding device 70, when attaching the attachment portion 72a to the attachment seat surface 35d of the seat portion 35c, one end surface 72e of attachment portion 72a is brought into contact with the abutting surface 35e of the seat portion 35c, while the non-illustrated positioning pin is inserted into the pin hole 72f of the attachment portion 72a and the pin hole 35f of the seat portion 35c. As a result, the shaft grounding device 70 is positioned in the rotary machine 1, in other words, the shaft grounding brush 71 is positioned relative to the shaft 40 (extension shaft 41).

In addition, the seat portion 35c has a screw hole 35g formed for a non-illustrated bolt to be screwed in, and the attachment portion 72a of the shaft grounding bracket 72 has a through hole 72g, formed to correspond to the screw hole 35g of the seat portion 35c, for the non-illustrated bolt to pass through.

Thus, when attaching the attachment portion 72a to the attachment seat surface 35d of the seat portion 35c, together with positioning as above, the non-illustrated bolt through is screwed through the through hole 72g of the attachment portion 72a into the screw hole 35g of the seat portion 35c to attach the shaft grounding device 70 to the first lid 35.

At this time, for the shaft grounding device 70, the shaft grounding brush 71 (carbon filaments) are oriented in a direction substantially orthogonal to the shaft 40 (toward the center axis of the extension shaft 41), while the distal end portion thereof is in contact with the extension shaft 41. Since the shaft grounding brush 71 is provided such that the distal end portion is substantially orthogonal to the extension shaft 41 and is brought into contact with the extension shaft 41, it is possible to positively ground the shaft voltage generated in the shaft 40 regardless of the rotation direction (the right rotation and left rotation in FIG. 2) of the extension shaft 41, in other words, the rotor 20.

As described above, since the one end surface 72e of the attachment portion 72a is brought into contact with the abutting surface 35e of the seat portion 35c while the shaft grounding device 70 is positioned using the non-illustrated positioning pin, it is possible to attach the shaft grounding device 70 to the first lid 35 with ease and a small space. Specifically, a space (space $S_3$) for attaching the shaft grounding device 70 can be made small.

In addition, attached at the through hole 35b of the first lid 35 is a seal 80, which separates space $S_3$ accommodating the shaft grounding device 70 from space $S_1$ accommodating the stator 10 and the rotor 20 and space $S_2$ accommodating the position detector 60. Thus, the wear of the shaft grounding brush 71 of the shaft grounding device 70 will not affect the stator 10, the rotor 20, the position detector 60, and the like.

Operation of the rotary machine according to this embodiment will be described with reference to FIGS. 1 to 4.

When the rotary machine 1 is driven, in other words, when the rotor 20 is rotated by the rotational magnetic field generated by the stator 10, the shaft 40 is rotated together with the rotor 20, and the non-illustrated drive unit connected to the direct-connection side of the shaft 40 is driven (see FIG. 1). Here, an electromagnetic induction voltage generated by magnetic imbalance and an electrostatic voltage resulting from rotational friction in the rotary machine 1 cause a shaft voltage at the shaft 40.

At this time, since the shaft grounding brush 71 on the shaft grounding device 70 is in contact with the extension shaft 41 connected to the shaft 40, the shaft voltage generated at the shaft 40 is discharged via the extension shaft 41 and the shaft grounding device 70 (see FIGS. 2 to 4). Thus, in the rotary machine 1, no discharge is caused at the bearing portions (bearings 50) by the shaft voltage, and no electrolytic corrosion will occur.

The state of contact between the shaft grounding brush 71 and the extension shaft 41 is determined by the attachment (positioning) of the shaft grounding device 70 to the seat portion 35c and the assembling position of the shaft grounding brush 71 to the shaft grounding bracket 72. Hence, by cutting the shaft grounding brush 71 such that the shaft grounding brush 71 protruding from the grounding bracket 72 has a specified length, after the shaft grounding brush 71 is assembled to the shaft grounding bracket 72, and by positioning the shaft grounding device 70 using the contact to the abutting surface 35e at the seat portion 35c and the positioning pin, the contact between the shaft grounding brush 71 and the extension shaft 41 can be made in a desired state.

According to this embodiment, by providing the recessed portion 35a for the first lid 35 forming space $S_2$ accommodating the position detector 60 and the like, it is possible to form space $S_3$ accommodating the shaft grounding device 70 and discharge the shaft voltage at the shaft 40 (extension shaft 41) with the shaft grounding device 70, without increasing the size of the rotary machine 1, in other words, the length of the rotary machine 1 in the axial direction.

Hence, for example, also in the case where the rotary machine 1 is not one to be newly built, but an existing one, the shaft grounding device 70 can be additionally attached regardless of the attachment space around the rotary machine 1. Specifically, only by replacing the part (a lid member) that forms space $S_2$ accommodating a position detector 60 or the like with the first lid 35 having the recessed portion 35a, it is possible to form space $S_3$ accommodating the shaft grounding device 70 without increasing the size of the rotary machine 1, in other words, the length of the rotary machine 1 in the axial direction.

As a matter of course, the end plate in the present invention is not limited to the first lid 35 that forms space $S_2$ accommodating the position detector 60 and the like as in this embodiment. The end plate in the present invention may be, for example, a lid member that forms a space accommodating electrical parts and the like other than the position detector 60, or the bracket 32 of the casing 30. As described above, in the case where the end plate in the present invention is the bracket 32 of the casing 30, the recessed portion 32a formed by the bracket 32 serves as a space accommodating the shaft grounding device 70 and the shaft grounding device 70 is attached to this recessed portion 32a.

REFERENCE SIGNS LIST 1 rotary machine
10 stator
11 coil end
20 rotor
30 casing
31 frame
32 bracket (end plate) on non-direct-connection side
32a recessed portion
32b through hole
33 bracket (end plate) on direct-connection side
33a recessed portion
33b through hole
34 annular portion
35 first lid (end plate, lid member)
35a recessed portion
35b through hole
35c seat portion (seat)
35d attachment seat surface
35e abutting surface (contact surface)
35f pin hole
35g screw hole
36 second lid
40 shaft (rotary shaft)
41 extension shaft (rotary shaft)
42 bolt
50 bearing
60 position detector (electrical part)
60a rotational portion
60b stationary portion
61 harness member (electrical part)
70 shaft grounding device
71 shaft grounding brush (brush member)
72 shaft grounding bracket (fixing member)
72a attachment portion
72b extension
72c brush attachment portion
72d folded-back portion
72e one end surface
72f pin hole
72g through hole
80 seal
$S_1$ space in rotary machine
$S_2$ space (electrical room) accommodating position detector
$S_3$ space accommodating shaft grounding device

The invention claimed is:

1. A rotary machine including a rotary shaft rotatably provided in a casing, the rotary machine comprising:
   an end plate provided on one end side of the casing in an axial direction;
   a recessed portion formed in the end plate and recessed inward of the casing;
   a through hole which is formed at the recessed portion of the end plate and through which one end portion of the rotary shaft passes; and
   a shaft grounding device which is provided at the recessed portion of the end plate and is in contact with the one end portion of the rotary shaft passing through the through hole to eliminate a shaft voltage generated at the rotary shaft,
   wherein the end plate is a first lid forming a first space which accommodates an electrical part, and
   wherein a second lid and the recessed portion of the first lid form a second space which accommodates the shaft grounding device.

2. The rotary machine according to claim 1, wherein:
   the shaft grounding device includes a brush member in contact with the rotary shaft and a fixing member to fix the brush member to the recessed portion, and
   the brush member includes a large number of filament members which are oriented in a direction orthogonal to the rotary shaft and arranged in the axial direction of the rotary shaft.

3. The rotary machine according to claim 2, wherein:
   the recessed portion includes a seat for attaching the fixing member, and
   the seat includes a contact surface contacting one end surface of the fixing member, a pin hole used to position the fixing member with a pin member, and a screw hole used to fix the fixing member with a bolt.

4. The rotary machine according to claim 2, wherein the filament members are made mainly from carbon.

5. The rotary machine according to claim 1, wherein the electrical room first space accommodates a position detector which detects a rotational phase of the rotary shaft.

6. The rotary machine according to claim 1, wherein the rotary machine comprises a seal member between the through hole and the rotary shaft.

7. The rotary machine according to claim 1, wherein the shaft grounding device is located within the second space.

8. The rotary machine according to claim 1, wherein:
   the shaft grounding device comprises a brush member in contact with the rotary shaft and a fixing member to fix the brush member to the recessed portion, and
   the shaft grounding device, which comprises the brush member and the fixing member, is located within the second space.

9. A rotary machine including a rotary shaft rotatably provided in a casing, the rotary machine comprising:
   an end plate provided on one end side of the casing in an axial direction;
   a recessed portion formed in the end plate and recessed inward of the casing;
   a through hole which is formed at the recessed portion and through which one end portion of the rotary shaft passes; and
   a shaft grounding device which is provided at the recessed portion and is in contact with the one end portion of the rotary shaft passing through the through hole to eliminate a shaft voltage generated at the rotary shaft, wherein:
   the shaft grounding device includes a brush member in contact with the rotary shaft and a fixing member to fix the brush member to the recessed portion,
   the brush member includes a large number of filament members which are oriented in a direction orthogonal to the rotary shaft and arranged in the axial direction of the rotary shaft,
   the recessed portion includes a seat for attaching the fixing member, and
   the seat includes a contact surface contacting one end surface of the fixing member, a pin hole used to position the fixing member with a pin member, and a screw hole used to fix the fixing member with a bolt.

10. The rotary machine according to claim 9, wherein the filament members are made mainly from carbon.

11. The rotary machine according to claim 9, wherein the rotary machine comprises a seal member between the through hole and the rotary shaft.

12. A rotary machine including a rotary shaft rotatably provided in a casing, the rotary machine comprising:
   an end plate provided on one end side of the casing in an axial direction;
   a recessed portion formed in the end plate and recessed inward of the casing;
   a through hole which is formed at the recessed portion and through which one end portion of the rotary shaft passes; and
   a shaft grounding device which is provided at the recessed portion and is in contact with the one end portion of the rotary shaft passing through the through hole to eliminate a shaft voltage generated at the rotary shaft,
   wherein the end plate is a lid member forming an electrical room which accommodates a position detector which detects a rotational phase of the rotary shaft.

* * * * *